Dec. 24, 1963  J. L. STOKES ETAL  3,115,431

METHOD AND APPARATUS FOR MAKING ORIENTED WOOD PARTICLE BOARD

Filed Sept. 10, 1959  6 Sheets-Sheet 1

INVENTORS
Joseph L. Stokes
and Maxwell M. Yan
BY Stevens, Davis, Miller & Mosher
ATTORNEYS Dec. 24, 1963　　　J. L. STOKES ETAL　　　3,115,431
METHOD AND APPARATUS FOR MAKING ORIENTED WOOD PARTICLE BOARD
Filed Sept. 10, 1959　　　6 Sheets-Sheet 2
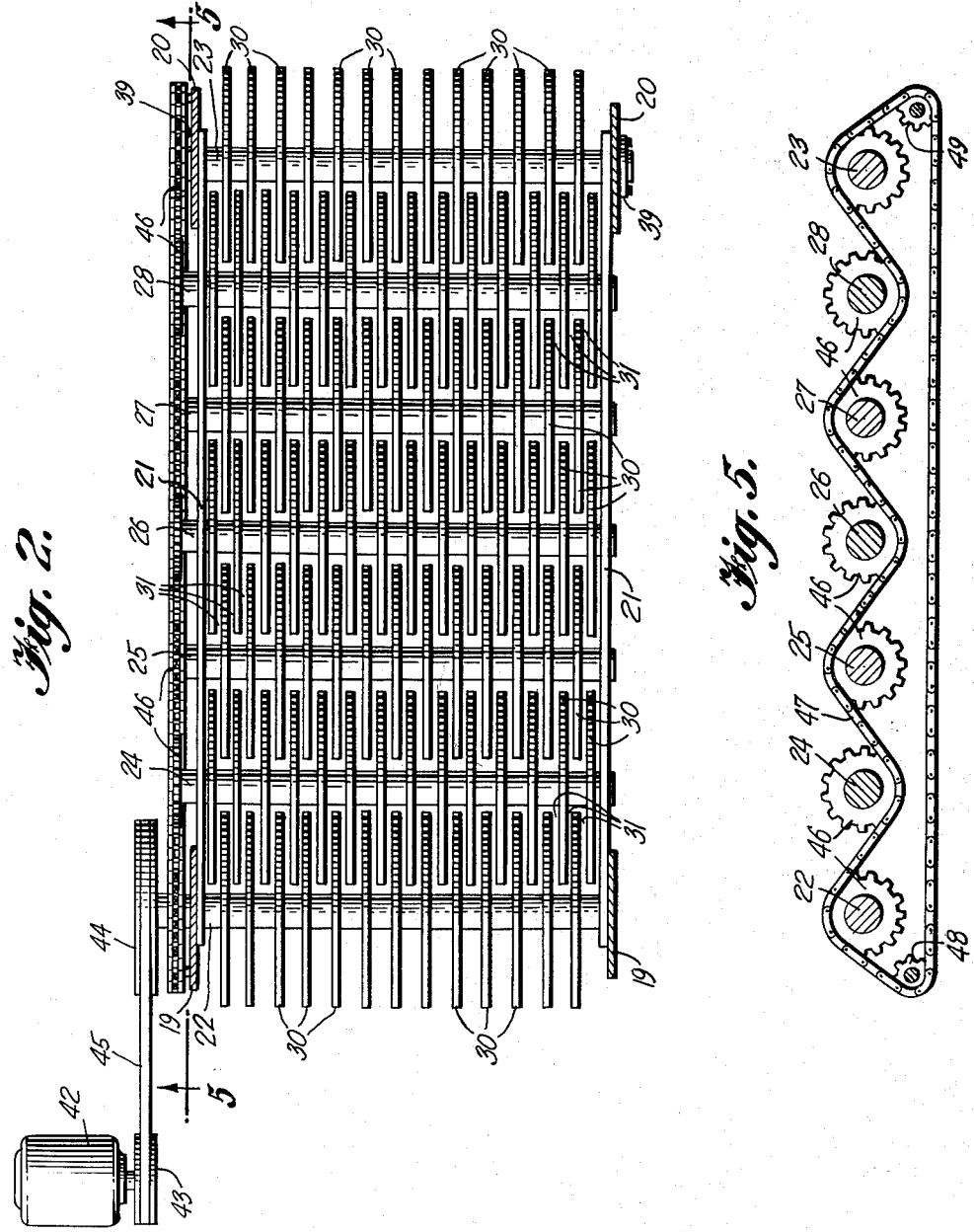
INVENTORS
Joseph L. Stokes and
Maxwell M. Yaw
BY Stevens, Davis, Miller & Mosher
ATTORNEYS Dec. 24, 1963 J. L. STOKES ETAL 3,115,431
METHOD AND APPARATUS FOR MAKING ORIENTED WOOD PARTICLE BOARD
Filed Sept. 10, 1959 6 Sheets-Sheet 3
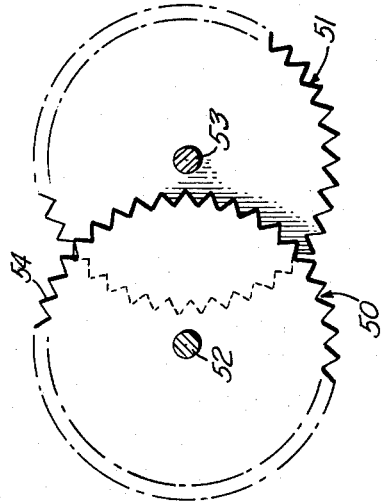
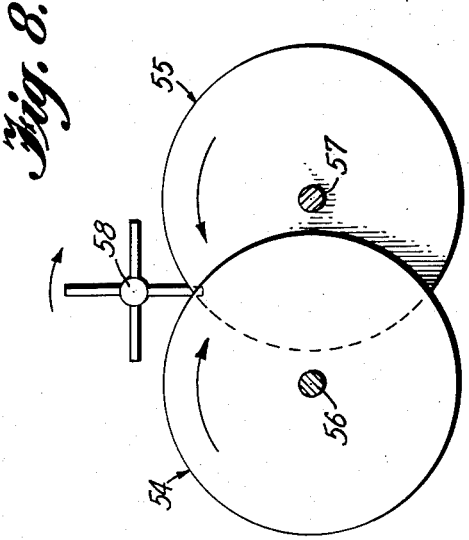
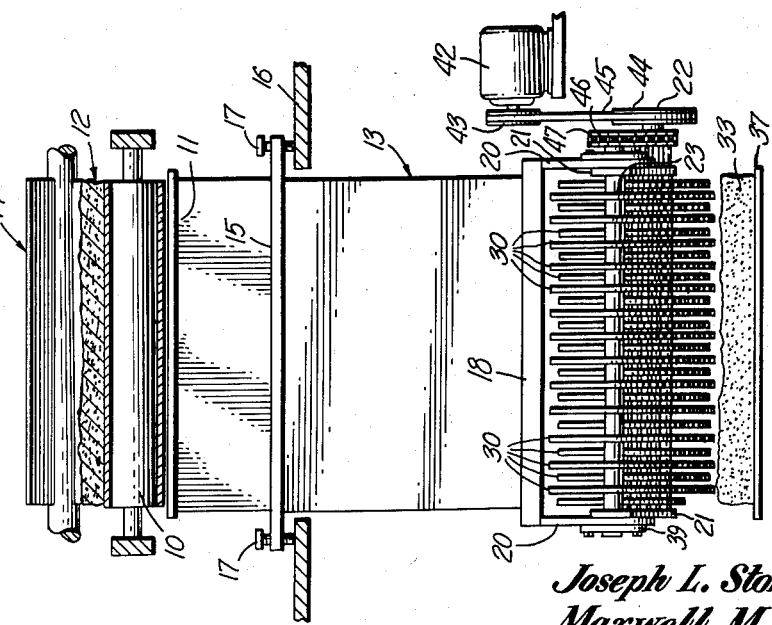
INVENTORS
Joseph L. Stokes and
Maxwell M. Yan
BY Stevens, Davis, Miller & Mosher
ATTORNEYS INVENTORS
Joseph L. Stokes and
Maxwell M. Yan
BY Stevens, Davis, Miller & Mosher
ATTORNEYS Dec. 24, 1963 J. L. STOKES ETAL 3,115,431
METHOD AND APPARATUS FOR MAKING ORIENTED WOOD PARTICLE BOARD
Filed Sept. 10, 1959 6 Sheets-Sheet 5

INVENTORS
Joseph L. Stokes and
Maxwell M. Yan
BY Stevens, Davis, Miller & Mosher
ATTORNEYS Dec. 24, 1963   J. L. STOKES ETAL   3,115,431
METHOD AND APPARATUS FOR MAKING ORIENTED WOOD PARTICLE BOARD
Filed Sept. 10, 1959   6 Sheets-Sheet 6

INVENTORS
Joseph L. Stokes and
Maxwell M. Yaw
BY Stevens, Davis, Miller & Mosher
ATTORNEYS

United States Patent Office 3,115,431
Patented Dec. 24, 1963

3,115,431
METHOD AND APPARATUS FOR MAKING ORIENTED WOOD PARTICLE BOARD
Joseph L. Stokes and Maxwell M. Yan, Sault Ste. Marie, Ontario, Canada, assignors to Abitibi Power & Paper Company, Limited, Iroquois Falls, Ontario, Canada
Filed Sept. 10, 1959, Ser. No. 839,099
6 Claims. (Cl. 156—32)

This invention relates to an apparatus for forming a mat of oriented wood particles and also to the product thereof. As explained in Yan et al., U.S. 2,854,372, particle board having particles, which may either be splinters or platelets, aligned in one direction has an advantage for many applications in that several physical properties such as flexural and tensile strength will, as in natural wood, be more fully developed in one direction than another. This makes it possible to provide a board having greater effective strength for certain uses than board with a random orientation.

The apparatus of this invention is an improvement over that described in U.S. 2,854,372. The equipment is simpler and can readily be added to existing forming lines making conventional particle board with random formation. Furthermore the wood particles can be oriented in any direction in the plane of the board surface, whereas the invention described in U.S. 2,854,372 can be used to orient the particles only in a direction parallel to one edge of the finished panel.

In accordance with this invention an apparatus is provided for forming a mat of oriented heterodimensional wood particles comprising a plurality of alignment members substantially parallel with each other to provide narrow alignment passages having a width not substantially greater than the average length of the wood particles, said alignment members being in a plane inclined to the horizontal so as to be substantially parallel to the line of formation of the mat. Means are provided for moving said adjacent alignment members relatively to each other to facilitate the orientation of particles passing through said alignment passages and to prevent clumping of said particles. Means are provided for feeding a dispersed stream of particles to the upper surface of said alignment members and forming means are located below said alignment members, said forming means having a forming surface movable relatively to the alignment members, the spacing between said alignment members and said forming means being such that the distances between the lower edges of said alignment members and the line of formation of the mat is not substantially greater than the average length of said wood particles. Preferably the alignment members comprise a series of rows of discs disposed with the discs of each row substantially parallel and coaxial with the discs of each row intermeshing with the discs of adjacent rows.

A construction in accordance with the foregoing avoids the tendency of wood particles to plug and bridge narrow openings and, in addition, the relative movement between the alignment members tends to swing particles into the desired orientation. The width of the alignment passages is not substantially greater than the average length of the wood particles to make certain that transversely disposed particles will be biased to the desired orientation. Even if the width of the passage is slightly greater than the length of the particles an orienting effect will almost invariably occur. The spacing between the alignment members and the forming means is not substantially greater than the average length of the wood particles to prevent the particles from losing their orientation and this may occur if the particles are allowed to fall freely for an extended distance.

A particular advantage of this invention resides in the formation of layered laminated board made from particles, each layer having particles oriented in a direction which is different from that of adjacent layers. This laminated product can be made by glueing together separately formed and compacted particle board. However, it is preferred that the advantages of the apparatus provided in accordance with this invention be fully utilized by providing a series of forming stations that will provide a mat built up of layers of differently oriented particles. Products can also be made which contain both random and oriented layers.

An unforeseen advantage of oriented particle board has been found to be that the internal bond or P.T.S. (perpendicular tensile strength, measured by glueing blocks to opposite faces of board samples and exerting tension perpendicular to the face until the board fails) of oriented board is 15% to 35% higher than that of random oriented board made from the same platelets. While the reason for this has not yet been established it may be due to the longer and more continuous contact between the surfaces of adjacent particles in the aligned board as compared with that having a random orientation. As a consequence a multi-layer laminate can be provided, the layers of which combine to give good physical properties in each direction equivalent to a laminate of boards having random oriented particles but with an internal bond which is greater than would be obtained using boards of a random orientation.

Referring now to the drawings illustrating the embodiments of this invention.

FIGURE 2 is a sectional view on the line 2—2 of FIGURE 1.

FIGURE 5 is a sectional view of the line 5—5 of FIGURE 2.

FIGURE 6 is a front elevation view of FIGURE 1 regarded from direction B.

FIGURE 7 illustrates a modification of this invention in which a particular disc shape is used.

FIGURE 8 is a side elevation view of a modification of this invention with an added spike roll.

Figure 1:
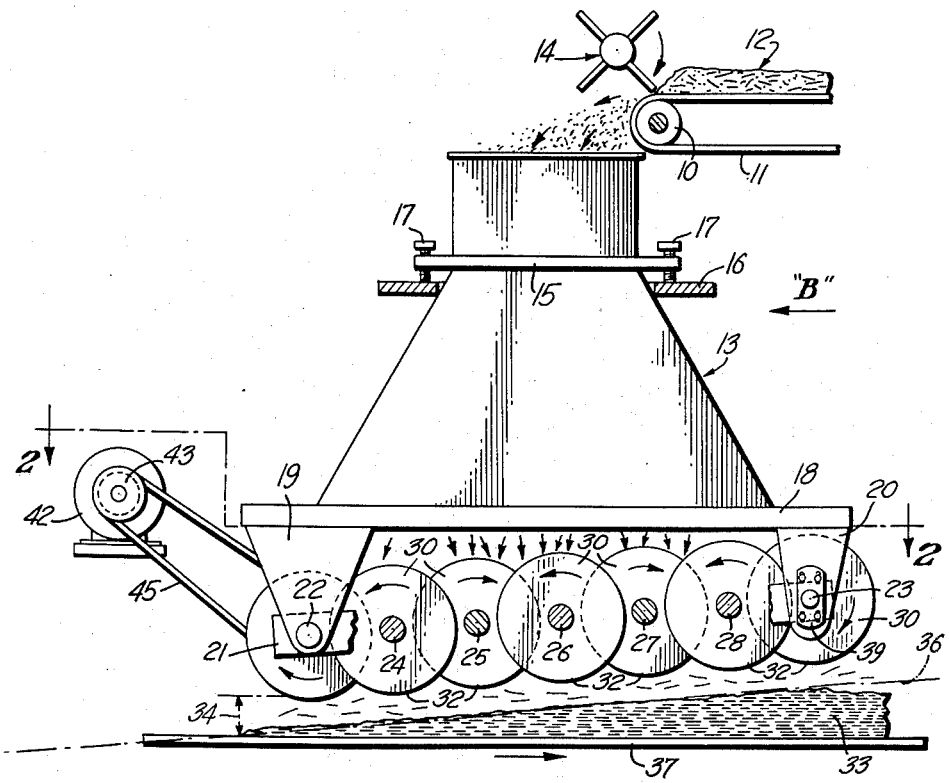
FIGURE 1 is a side elevation view of an apparatus embodying the invention.

Referring now to the apparatus shown in FIGURES 1 to 6 of the drawings, roll 10 and belt 11 supply a uniform layer of particles 12 to distributor 13. Spike roll 14 assists in feeding particles 12 uniformly into distributor 13 and in breaking up particle clumps. Distributor 13 which has a flange 15 mounted on fixed frame 16 by adjustment screws 17 is preferably of the type shown in Hale and Stokes, U.S. 2,825,388, issued March 4, 1956, and entitled "Dispenser Feed Device." As the details of distributor 13 are fully shown in the foregoing patent they have been omitted from the instant description. Secured to the lower flange 18 of distributor 13 are supporting brackets 19 and 20 at the lower ends of which are mounted two orienting member supporting bars 21. Shafts 22 and 23 are journalled in supporting bars 21 and in brackets 19 and plate 39, respectively. Shafts 24, 25, 26 and 27 and 28 are journalled in supporting bars 21. A plurality of discs 30 are mounted on each of shafts 22, 24, 25, 26, 27, 28 and 23 respectively with the discs on adjacent shafts such as 22 and 24 staggered and overlapping as best illustrated in FIGURE 2, so as to provide a series of rows of discs disposed with the discs of each row substantially parallel and coaxial, and with the discs of each row intermeshing with the discs of adjacent rows. Narrow alignment passages such as 31 are provided between the discs. These alignment passages 31 have a width not substantially greater than the average length of the wood particles.

Figure 3:
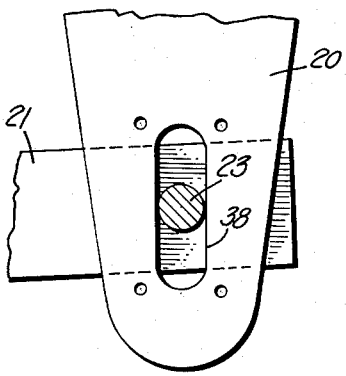
FIGURE 3 is a detailed elevation view of part of FIGURE 1.
Figure 4:
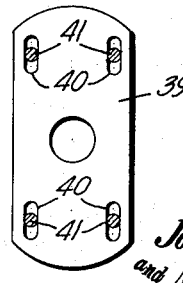
FIGURE 4 is a detailed elevation view of part of FIGURE 1.

It will be noted that bracket 19 is longer than bracket 20 so as to locate supporting bars 21 and consequently the lower edges 32 of discs 30 in a plane inclined to the horizontal. The lower edges 32 of the discs are substantially parallel to the line of formation 36 of the mat 33 which is being formed. The spacing between the lower edges 32 of the discs and the line of formation 36 is maintained as small as possible and should not be substantially greater than the average length of the particles. This is because the particles will tend to lose their orientation if allowed an unconfined fall for a substantial distance. In addition a vertical particle will tend to fall in the desired direction of orientation if its upper end is confined at the time that its lower end reaches the line of formation. As the line of formation 36 will vary slightly according to the rate at which particles are fed in from belt 11 and the speed of movement of carrying caul 37 upon which mat 33 is deposited. Supporting bar 21 is preferably adjustably mounted on lug 20 as illustrated in FIGURES 3 and 4 which show bracket 20 shaped to provide an upwardly extending slot 38 to accommodate different vertical positions of shaft 23. Shaft 23 is mounted in plate 39 which has slots 40 to receive bolts 41. Bolts 41 extend outwardly from bracket 20.

Shaft 22 is driven by motor 42 through sheaves 43 and 44 and belt 45. Sprocket wheels 46 are located on each of shafts 22, 24, 25, 26, 27, 28 and 23 and are drivably connected together by sprocket chain 47, which, as illustrated in FIGURE 5, rides on idlers 48 and 49 and is arranged to drive the adjacent shafts such as shafts 22 and 24 counter to each other.

Typical shavings forming one type of particle board have a thickness of 0.005 in. to 0.030 in. a length of 0.5 in. to 4 in. and a width of 0.03 in. to 1 in. Typical splinters are ¼ in. to ¾ in. long and 1/64 in. to 1/8 in. thick. Although as indicated above the spacing between discs 30 is not substantially greater than the average length of the particles a narrow spacing is preferred. A spacing of about ⅝ in. has been found to be satisfactory for platelets averaging about 1 in. long. Discs 30 preferably are of a material having a fairly high coefficient friction as to impart a turning moment to particles which are not correctly oriented. The best speed of rotation of the discs will depend on many variables but may be of the order of 90 r.p.m.

Reference may be made to U.S. 2,854,372 for further particulars of the formation of the particles into board such as the amount of resin used.

Referring now to FIGURE 7 of the drawings a modification is shown in which discs 50 and 51 are mounted on shafts 52 and 53 respectively and are arranged in a series of rows similar to that described in connection with FIGURE 2. In the modification shown in FIGURE 7 each of discs 50 and 51 have saw-toothed or other irregular edges 54 to increase the drag and to improve clump clearing characteristics.

Figure 9:
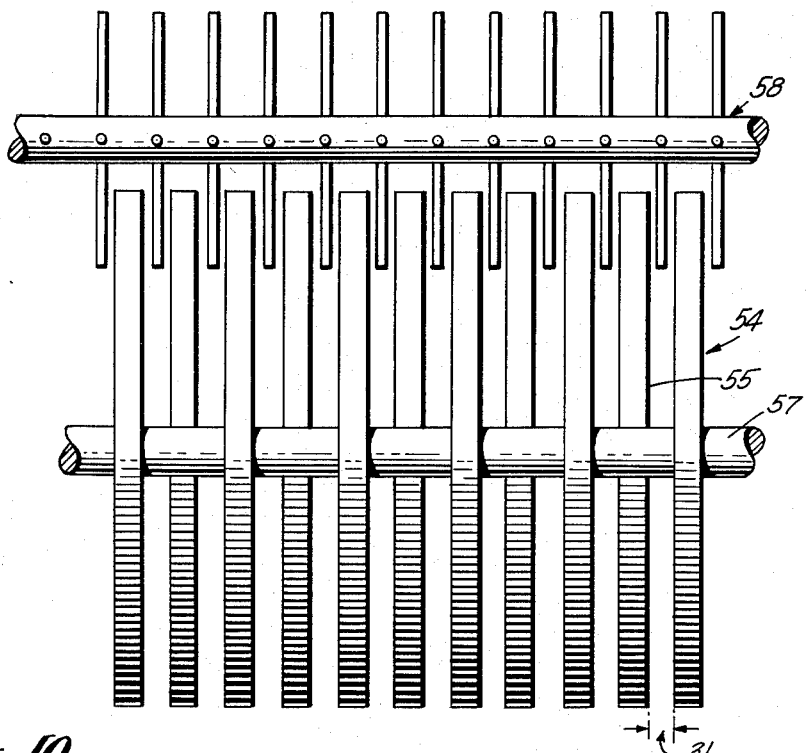
FIGURE 9 is a front view of the modification shown in FIGURE 8.

A further modification is shown in FIGURE 8 which illustrates discs 54 and 55 mounted on shafts 56 and 57 similarly to FIGURE 7. Discs 54 and 55 are the same as those shown in FIGURE 2. However, a spike roll 58 is provided above the discs in such a position that the ends of the spikes are just clear of or slightly intermeshed with discs 54 and 55 as shown in FIGURES 8 and 9. Spike roll 58 revolves at a higher speed than discs 54 and 55 so as to break up any clumps which may arrive or start forming at the upper edges of the discs and to disperse any over-length pieces which otherwise might staple across the openings and cause plugs.

Figure 10:
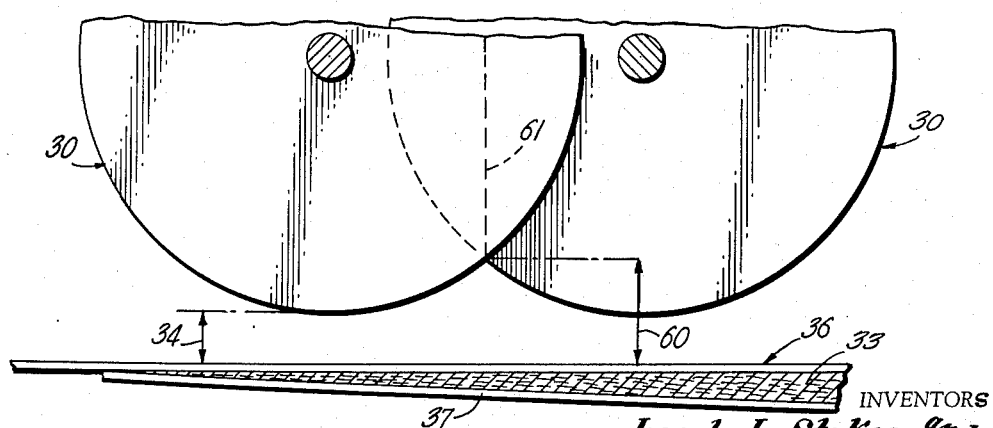
FIGURE 10 is a diagrammatic view showing the distances between the lines of formation and the alignment members.

In the construction illustrated in FIGURES 1 to 9 inclusive it has been explained that the profile of the lower edges of the discs should be substantially parallel to the line of formation 36. It should be noted however, that the distance of free unconfined fall varies since the periphery of the orienting element such as discs 30 is circular. In this connection a comparison may be made between dimensions 34 and 60 in FIGURE 10. To avoid any areas in which there is an excessively high free fall it is recommended that the lowest point of the common chord 61 between the discs of adjacent rows be at a distance not substantially greater than twice the average length of the wood particles from the line of formation of the mat.

Figure 11:
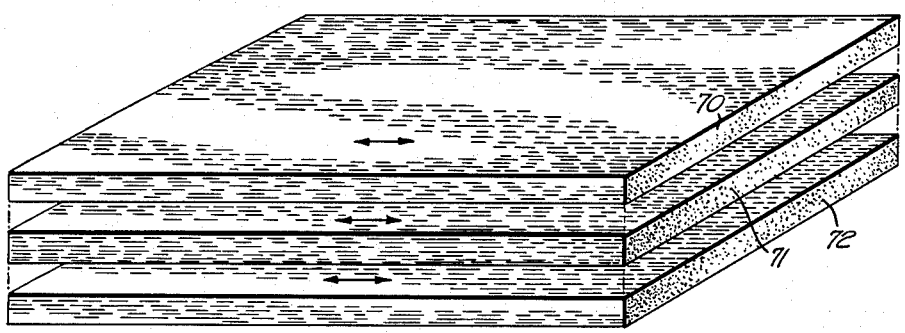
FIGURE 11 is a diagrammatic exploded perspective view of an oriented product in which the direction of orientation is the same throughout the thickness.

FIGURE 11 illustrates diagrammatically the construction of a panel exploded to layers 70, 71 and 72 having particles oriented in each case in one direction as indicated by the arrows. The board shown in FIGURE 11 will have directional properties.

Figure 12:
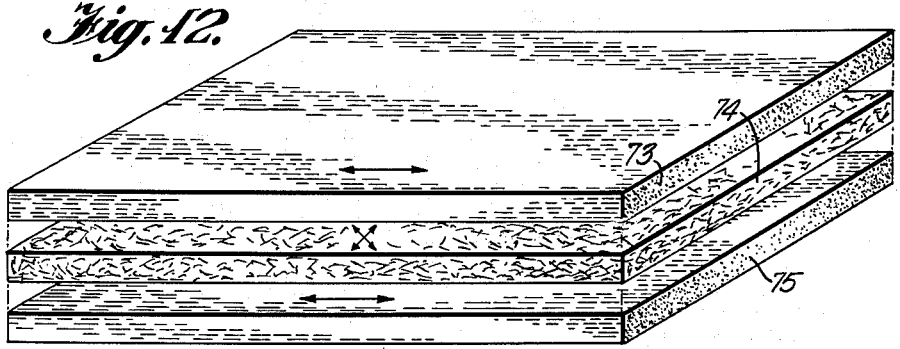
FIGURE 12 is similar to FIGURE 11 but shows a layered or laminated product in which the surfaces are oriented in the same direction and the central core has a random formation.

FIGURE 12 shows a laminate of boards or layers 73, 74 and 75. It is noted that as indicated by the arrows, boards 73 and 75 have their constituent particles oriented in one direction as compared with the core provided by board 74, the particles of which have a random orientation.

Figure 13:
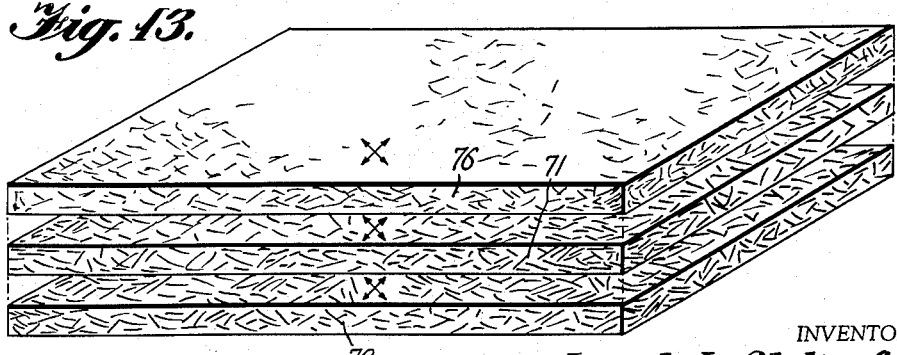
FIGURE 13 is a view similar to FIGURES 11 and 12 but showing a board with conventional random formation.
Figure 14:
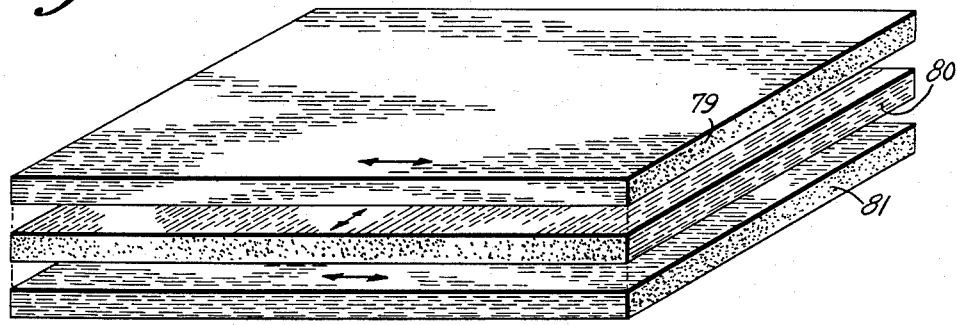
FIGURE 14 is similar to FIGURES 11 to 13 but shows a board with the centre layer oriented at right angles to the surfaces.

In FIGURE 13 a conventional laminate is shown made from boards 76, 77 and 78, each of which consists of particles having a random orientation. By way of contrast with FIGURE 13, FIGURE 14 shows a laminate of boards 79, 80 and 81. Boards 79 and 81 have particles oriented in one direction and the board 80, which is sandwiched between boards 79 and 81, has particles oriented transversely to those of boards 79 and 81. Using layers of appropriate thickness the tensile strength of the boards shown in FIGURE 14 will be substantially equivalent to that of the boards shown in FIGURE 13 in whichever direction the tensile strength is tested. However, the internal bond of the board shown in FIGURE 14 will be greater than that of the board shown in FIGURE 13.

Figure 15:
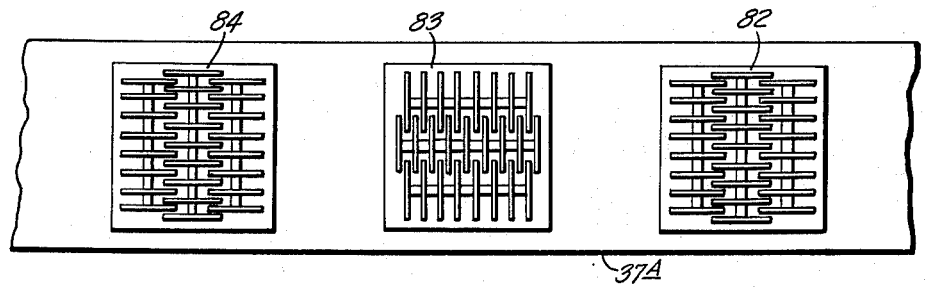
FIGURE 15 is a diagrammatic view showing the forming stations used in making the board shown in FIGURE 14.

The board shown in FIGURE 14 can be made by separately forming and consolidating boards 79, 80 and 81, then glueing the boards together in the relationship shown in FIGURE 14, but alternatively a system can be used as shown in FIGURE 15 in which resinized particles are deposited to form a multi-layer mat using an initial forming station 82 adapted to orient the particles in the direction of movement of forming conveyor or caul plate 37A, following which forming station 83 provides particles oriented substantially perpendicular to the direction of movement of caul plate 37A and finally forming station 84 deposits particles substantially parallel to the direction of movement of caul plate 37A.

By the proper choice of random and orienting forming stations a variety of structures may be produced such as a board with a random core and oriented surfaces, or with an oriented core and random surfaces. The choice of construction will depend on properties desired.

Figure 16:
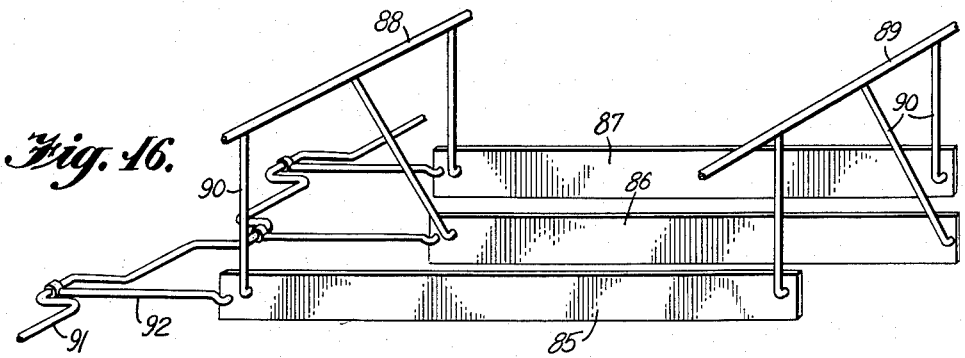
FIGURE 16 is a perspective view illustrating an apparatus in accordance with an alternative embodiment of this invention.

FIGURE 16 shows an alternative embodiment of this invention in which plates 85, 86 and 87 are substituted for discs 30 of FIGURES 1 to 6, to provide alignment members. Plates 85, 86 and 87 are mounted at each end on shafts 88 and 89 respectively by links 90. Crank shaft 91 is joined by connecting members 92 to plates 85, 86 and 87 to cause adjacent plates such as 85 and 86 to reciprocate out of phase with each other so as to provide a relative movement between the alignment members.

We claim:

1. The method of making a laminated board product comprising a plurality of layers adhered together in face-to-face relationship, each of said layers consisting of wood particles of greater length than thickness and width adhered together and each of said layers having particles oriented so that the particles within the layer extend substantially in one direction, the orientation of the particles in adjacent layers being transverse to each other, and in which a plurality of forming stations, each comprising spaced alignment members moving relatively to each other for directionally orienting said wood particles while said particles are in motion, are established in sequence over a moving mat-forming support and in which particles having a coating of resinous binder are directionally aligned in one direction by the alignment members of one forming station to provide a layer of particles oriented in one direction on said support and in which the portion of said support on which said layer has been deposited moves to an adjacent forming station of said sequence where a layer of resin-coated particles is deposited with those particles oriented in a direction transverse to said one direction by the alignment members of said adjacent forming station, and in which the mat formed on said support by means of the sequence of forming stations is thereafter consolidated under heat and pressure.

2. An apparatus for forming a mat of oriented heterodimensional wood particles comprising a series of rows of discs disposed with the discs of each row substantially parallel and coaxial and with the discs of each row intermeshing with the discs of adjacent rows to provide narrow alignment passages between the discs having a width not substantially greater than the average length of the wood particles, said discs being in a plane inclined to the horizontal so as to be substantially parallel to the line of formation of the mat, means for rotating said discs about their axis, means for feeding a dispersed stream of particles to the upper surface of said discs and forming means below said discs said forming means having a forming surface movable relatively to the discs, the spacing between said discs and said forming means being such that the distance between the lower edges of said discs and the line of formation of the mat is not substantially greater than the average length of said wood particles.

3. An apparatus as in claim 2 in which the lowest point of the common chord between the discs of adjacent rows is not at a distance substantially greater than twice the average length of said wood particles from the line of formation of the mat.

4. An apparatus as in claim 2 in which said discs have saw-toothed edges.

5. An apparatus as in claim 2 including spike rolls intermeshing with the upper edges of said discs to break up clumped particles.

6. An apparatus as in claim 2 in which the discs of adjacent rows are adapted to rotate counter to each other.

References Cited in the file of this patent
UNITED STATES PATENTS

| | | |
|---|---|---|
| 2,055,630 | McLean | Sept. 29, 1936 |
| 2,130,353 | Lowry | Sept. 20, 1938 |
| 2,649,034 | Gramelspacher | Aug. 18, 1953 |
| 2,671,550 | Schultz | Mar. 9, 1954 |
| 2,758,697 | Schultz | Aug. 14, 1956 |
| 2,822,024 | Himmelheber et al. | Feb. 4, 1958 |
| 2,825,388 | Hale et al. | Mar. 4, 1958 |
| 2,854,372 | Yan et al. | Sept. 30, 1958 |
| 3,051,219 | Kaiser | Aug. 28, 1962 |